(12) United States Patent
Thiemke et al.

(10) Patent No.: US 7,185,596 B2
(45) Date of Patent: Mar. 6, 2007

(54) SEED SLIDE FOR USE IN AN AGRICULTURAL SEEDING MACHINE

(75) Inventors: Daniel B. Thiemke, Rock Island, IL (US); Jose M. Valdez, Montpelier, IA (US)

(73) Assignee: Deere & Company, Moline, IL (US)

( * ) Notice: Subject to any disclaimer, the term of this patent is extended or adjusted under 35 U.S.C. 154(b) by 309 days.

(21) Appl. No.: 10/339,970

(22) Filed: Jan. 10, 2003

(65) Prior Publication Data

US 2004/0134400 A1 Jul. 15, 2004

(51) Int. Cl.
*A01C 7/00* (2006.01)

(52) U.S. Cl. ..................................... 111/185

(58) Field of Classification Search .............. 111/183, 111/184, 185, 182, 181, 178, 177; 221/211, 221/210, 217; 222/225
See application file for complete search history.

(56) References Cited

U.S. PATENT DOCUMENTS

| | | | | |
|---|---|---|---|---|
| 312,594 | A * | 2/1885 | Williams ........................ 111/89 |
| 2,547,867 | A * | 4/1951 | Judson ........................ 222/139 |
| 3,048,132 | A * | 8/1962 | Morgan et al. ............. 111/153 |
| 3,626,877 | A * | 12/1971 | Hansen et al. ............... 111/177 |
| 3,627,050 | A * | 12/1971 | Hansen et al. ............... 111/184 |
| 3,913,503 | A * | 10/1975 | Becker .......................... 111/77 |
| 4,196,679 | A | 4/1980 | Moore ........................... 111/85 |
| 4,339,757 | A * | 7/1982 | Chu ......................... 343/781 P |
| 4,915,258 | A | 4/1990 | Olson .......................... 221/211 |
| 5,027,725 | A * | 7/1991 | Keeton ........................ 111/184 |
| 5,842,428 | A | 12/1998 | Stufflebeam et al. ......... 111/185 |
| 5,974,988 | A | 11/1999 | Stufflebeam et al. ......... 111/185 |
| 6,058,860 | A * | 5/2000 | Kinkead et al. ............... 111/11 |
| 6,173,664 | B1 | 1/2001 | Heimbuch |
| 6,209,466 | B1 | 4/2001 | Wodrich |
| 6,237,514 | B1 * | 5/2001 | Romans ....................... 111/171 |
| 6,247,417 | B1 * | 6/2001 | Heimbuch ................... 111/178 |
| 6,332,413 | B1 | 12/2001 | Stufflebeam et al. ......... 111/170 |
| 6,581,535 | B2 * | 6/2003 | Barry et al. ................. 111/181 |
| 6,651,570 | B1 * | 11/2003 | Thiemke ...................... 111/184 |
| 6,681,706 | B2 * | 1/2004 | Sauder et al. ................ 111/171 |
| 2002/0043200 | A1 | 4/2002 | Rosenboom |
| 2003/0159631 | A1 | 8/2003 | Sauder et al. |

* cited by examiner

*Primary Examiner*—Victor Batson
(74) *Attorney, Agent, or Firm*—Taylor & Aust, P.C.

(57) ABSTRACT

A seeding machine includes at least one seed metering system and at least one seed placement system. Each seed placement system is in communication with a corresponding seed metering system. Each seed placement system includes a seed slide having a bottom end and a seed trough terminating at the bottom end.

10 Claims, 4 Drawing Sheets

SEED SLIDE FOR USE IN AN AGRICULTURAL SEEDING MACHINE

FIELD OF THE INVENTION

The present invention relates to agricultural seeding machines, and, more particularly, to a seed slide used in a seed placement system.

BACKGROUND OF THE INVENTION

An agricultural seeding machine such as a row crop planter or grain drill places seeds at a desired depth within a plurality of parallel seed trenches formed in soil. In the case of a row crop planter, a plurality of row crop units are typically ground driven using wheels, shafts, sprockets, transfer cases, chains and the like. Each row crop unit has a frame which is moveably coupled with a tool bar. The frame may carry a main seed hopper, herbicide hopper and insecticide hopper. If a granular herbicide and insecticide are used, the metering mechanisms associated with dispensing the granular product into the seed trench are relatively simple. On the other hand, the mechanisms necessary to properly meter the seeds, dispense the seeds at a predetermined rate and place the seeds at predetermined relative locations within the seed trench are relatively complicated.

The mechanisms associated with metering and placing the seeds generally can be divided into a seed metering system and a seed placement system which are in communication with each other. The seed metering system receives the seeds in a bulk manner from the seed hopper carried by the frame. Different types of seed metering systems may be used such as seed plates, finger plates, and seed discs. In the case of a seed disc metering system, a seed disc is formed with a plurality of seed cells spaced about the periphery thereof. Seeds are moved into the seed cells, with one or more seeds in each seed cell depending upon the size and configuration of the seed cell. A vacuum or positive pressure air may be used in conjunction with the seed disc to assist in movement of the seeds into the seed cells. The seeds are singulated and discharged at a predetermined rate to the seed placement system.

The seed placement system may be categorized as a gravity drop system or a power drop system. In the case of a gravity drop system, a seed tube has an inlet end which is positioned below the seed metering system. The singulated seeds from the seed metering system merely drop into the seed tube and fall via gravitational force from a discharge end thereof into the seed trench. The seed tube may be curved in a rearward manner to assist in directing seed into the seed trench. The rearward curvature also assists in reducing bouncing of the seeds back and forth within the tube as it falls therethrough into the seed trench. Further, the rearward curvature reduces bouncing of the seed as it strikes the bottom of the seed trench.

A seed placement system of the power drop variety generally can be classified as a seed conveyor belt drop, rotary valve drop, chain drop or air drop. These types of seed placement systems provide more consistent placement of the seeds along a predetermined path at a desired spacing. For more details of these types of seed placement systems, as well as agricultural planting in general, reference is hereby made to the technical document entitled "PLANTING FUNDAMENTALS OF MACHINE OPERATION", Breece, Edward H., PhD, et al.; Deere & Co.; 1981, which is incorporated herein by reference.

What is needed in the art is an agricultural seeding machine providing an accurate, efficient and compact seed metering system and seed placement system.

SUMMARY OF THE INVENTION

The present invention provides a seed slide for use in a seed placement system in an agricultural seeding machine. The seed slide includes a seed trough which terminates at the bottom end of the seed slide, and increases in depth from the top end to the bottom end of the seed slide.

The invention comprises, in one form thereof, a seeding machine including at least one seed metering system and at least one seed placement system. Each seed placement system is in communication with a corresponding seed metering system. Each seed placement system includes a seed slide having a bottom end and a seed trough terminating at the bottom end.

The invention comprises, in another form thereof, a method of placing seeds with a seeding machine in a trench formed in soil. Seeds are received at a predetermined rate at a seed slide in a seed placement system. The seed slide has a bottom end and a seed trough terminating at the bottom end. The seeds are engaged at the predetermined rate within the seed trough. The seeds are guided from the seed trough into the trench at a trajectory which is defined by the seed trough.

An advantage of the present invention is that the seed trajectory into the seed trench is more precisely controlled as a result of the seed trough in the seed slide.

Another advantage is that the constantly increasing depth of the seed trough in the seed slide provides positive engagement of the seeds in the nip between the seed slide and wheel, while at the same time providing a more accurate seed trajectory from the bottom end of the seed slide.

Yet another advantage is that the seed trough may be relatively easily formed in the seed slide.

An advantage of the present invention is that the wheel meters and accelerates the seeds in a positive manner.

Another advantage is that the bristles at the circumferential periphery of the wheel positively engage the seeds and carry the seeds past the seed slide, regardless of the size and orientation of the seeds.

Yet another advantage is that the gripping outside layer at the circumferential periphery of the wheel may take the form of several different materials having a high coefficient of friction, such as bristles, a foam pad, an expanded foam pad, a mesh pad, a fiber pad and a grit layer.

DETAILED DESCRIPTION OF THE INVENTION

Figure 1:
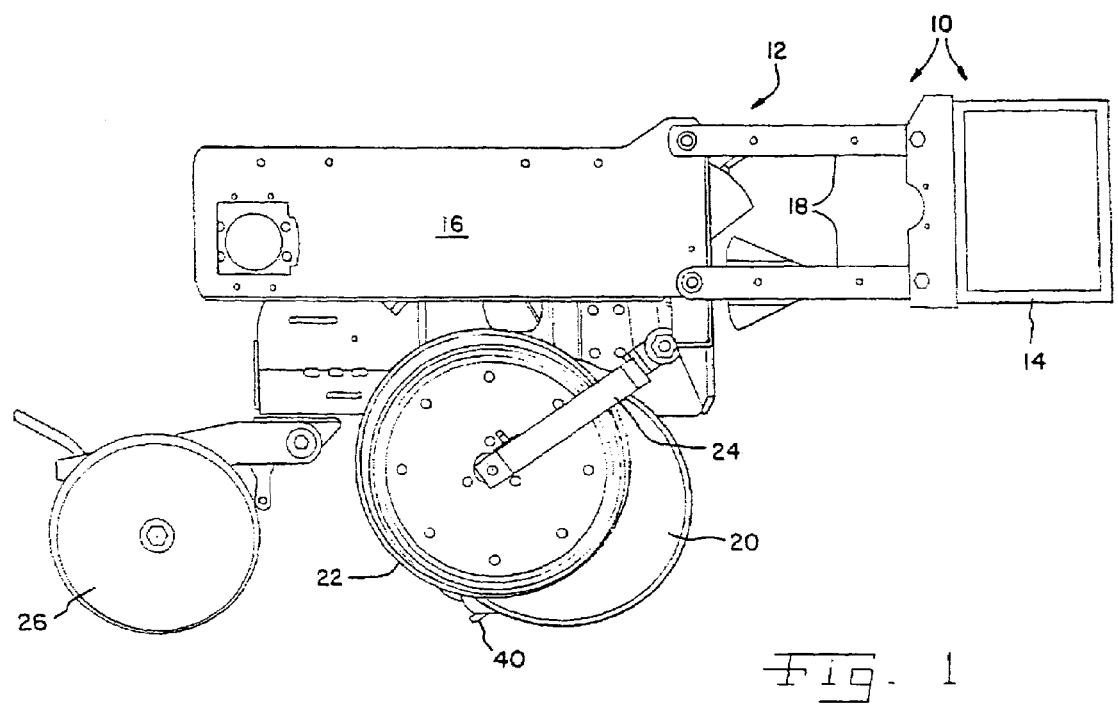
FIG. 1 is a side view of an embodiment of a seeding machine of the present invention including a row crop unit.
Figure 2:
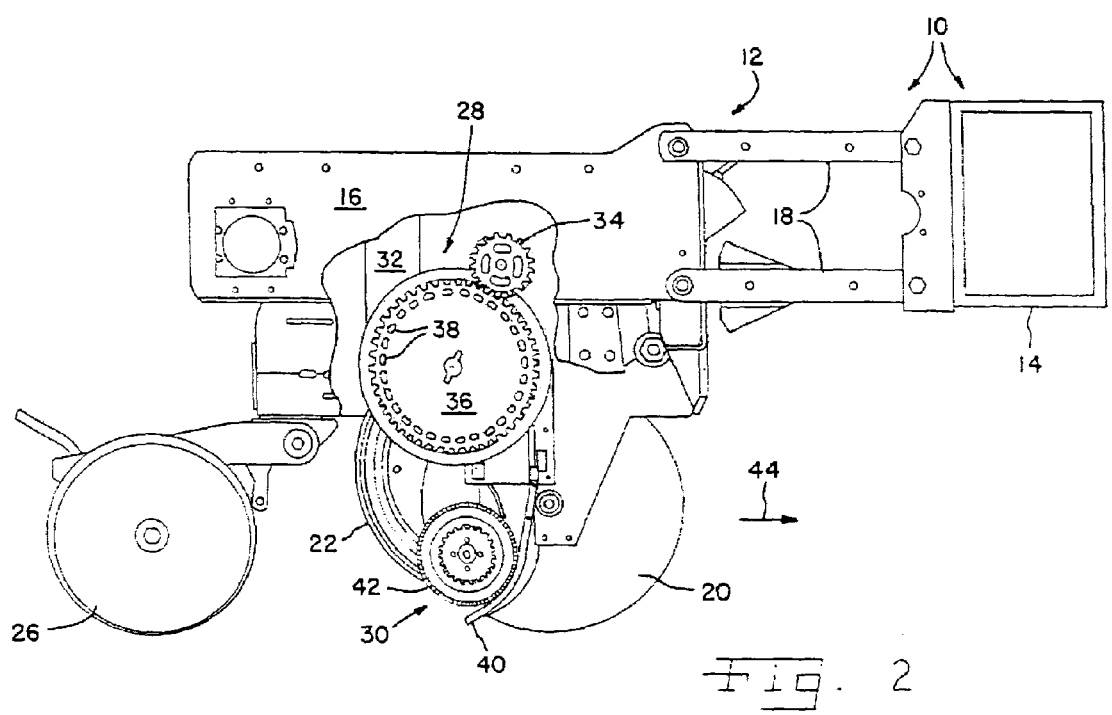
FIG. 2 is a partially fragmentary, side view of the row crop unit shown in FIG. 1, illustrating the internal components of the seeds metering system and seed placement system.
Figure 3:
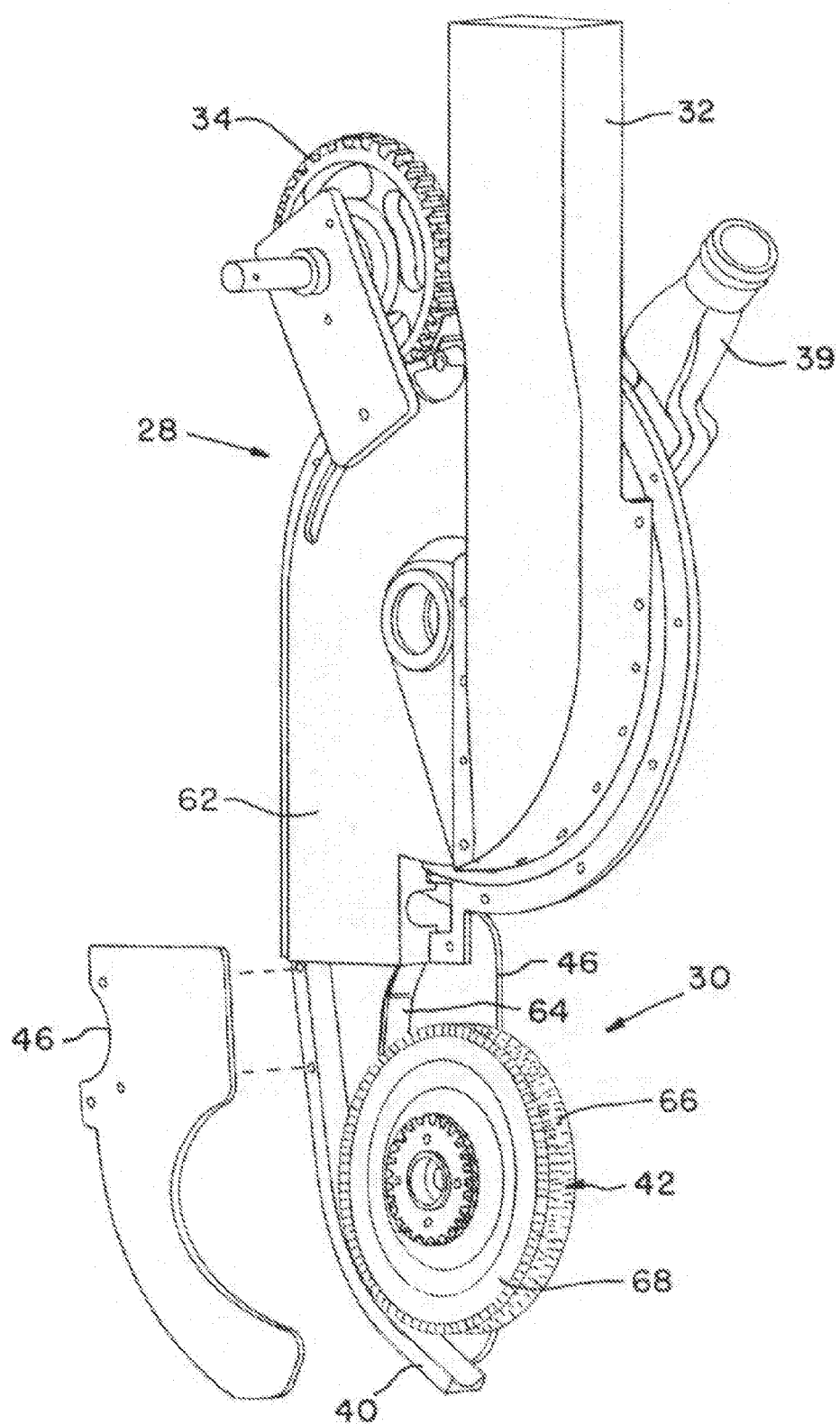
FIG. 3 is a perspective view of the seed metering system and seed placement system shown in FIG. 2, with one of the side plates removed to show the wheel and seed slide.
Figure 4:
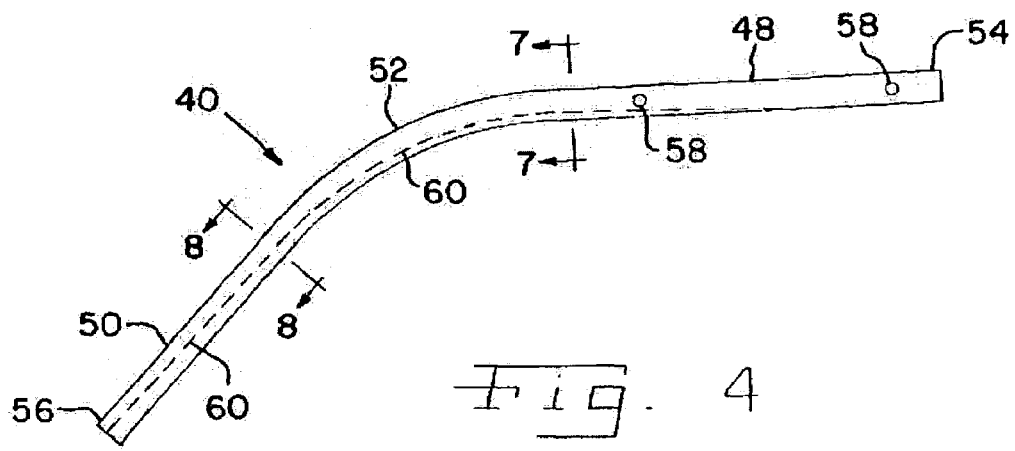
FIG. 4 is a side view of the seed slide shown in FIGS. 1–3.
Figure 5:
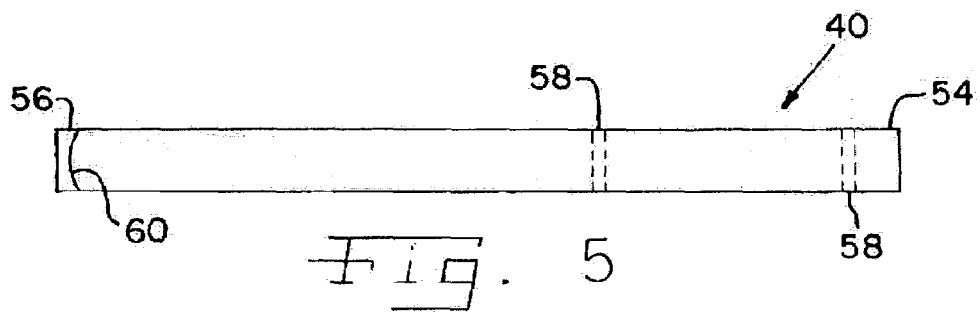
FIG. 5 is a plan view of the seed slide shown in FIG. 4.
Figure 6:
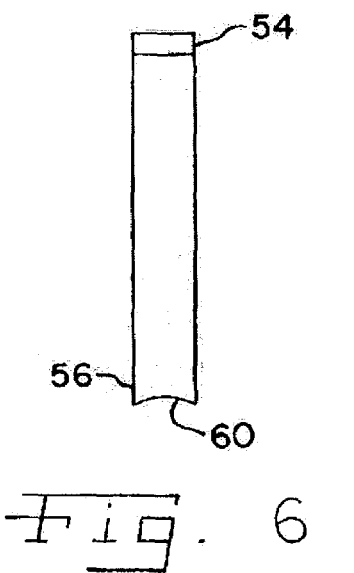
FIG. 6 is an end view of the seed slide shown in FIGS. 4 and 5 as viewed from the top end thereof.
Figure 7:
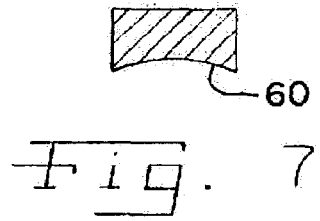
FIG. 7 is a sectional view of the seed slide shown in FIG. 4, taken along line 7—7.
Figure 8:
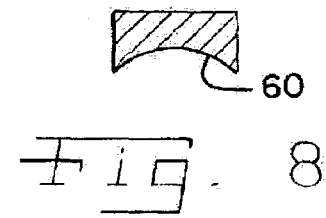
FIG. 8 is a sectional view of the seed slide shown in FIG. 4, taken along line 8—8.
Figure 9:
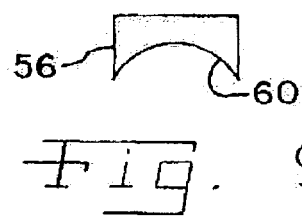
FIG. 9 is an end view of the seed slide shown in FIG. 4, as viewed from the bottom end thereof.

Referring now to the drawings, and more particularly to FIGS. 1 and 2, there is shown an embodiment of a seeding machine 10 of the present invention. In the embodiment shown, seeding machine 10 is in the form of a row crop planter but may also be in the form of a grain drill, etc. FIGS. 1 and 2 illustrate a single row crop unit 12 of a multi-row planter, with each row crop unit 12 being substantially identical and connected to a common tool bar 14. Only a single row crop unit 12 is shown for simplicity sake.

Row crop unit 12 includes a multi-part frame 16 which is attached to tool bar 14 by parallel linkage 18. Tool bar 14 is coupled to a traction unit (not shown), such as an agricultural tractor. For example, tool bar 14 may be coupled to an agricultural tractor using a 3-point hitch assembly. Tool bar 14 may be coupled with transport wheel assemblies, marker arms, etc. which may be of conventional design and not shown for simplicity sake. The transport wheels, in known manner, may provide ground drive to row crop unit 12 through the use of shafts, chains, sprockets, transfer cases, etc.

Frame 16 carries a double disc furrow opener 20 for forming a seed trench in soil. A pair of gauge/closing wheels 22 are respectively associated with the pair of discs of double disc furrow opener 20. More particularly, each gauge/closing wheel 22 is positioned generally in line with and immediately adjacent to the outside of each respective disc of double disc furrow opener 20. Gauge/closing wheels 22 are pivotally coupled with frame 16 by respective arms 24. Each gauge/closing wheel 26 may be vertically adjusted to adjust the depth of the trench which is cut into the soil using double disc furrow opener 20.

A pair of closing wheels 26 are also carried by frame 16. Closing wheels 26 are positioned generally in line with double disc furrow opener 20.

Referring now to FIG. 2, each row crop unit 12 of seeding machine 10 carries a seed metering system 28 and a seed placement system 30. Seed metering system 28 includes an inlet chute 32 which receives seed from a main seed supply, such as a seed hopper carried above frame 16. Alternatively, seed may be stored in a distant main seed hopper and supplied to inlet chute 32 via air or the like.

Seed metering system 28 also includes a drive wheel 34 which drives a seed disc 36 having a plurality of seed cells 38 intermittently spaced about the periphery thereof. A coupler 39 is fluidly coupled with a vacuum source (not shown) for applying vacuum pressure to seed cells 38 formed in seed disc 36. This vacuum pressure promotes entry of the seeds into seed cells 38 and maintains the seeds in place within seed cells 38. Seeds are transported from seed cells 38 to seed placement system 30.

Seed placement system 30 includes a seed slide 40 and wheel 42. Seed slide 40 directs seed at a predetermined rate into the seed trench formed by double disc furrow opener 20. Seed slide 40 has a width in a direction transverse to the seed trench which is less than the width of the seed trench, but may also be approximately equal to the width of the seed trench.

Wheel 42 defining a seed velocity regulator has a circumferential periphery which is positioned at or closely adjacent to seed slide 40. Wheel 42 engages the seeds received at seed placement system 30 at the predetermined rate and regulates the seeds to a speed substantially corresponding to the traveling speed of seeding machine 10 in travel direction 44. Wheel 42 and seed slide 40 co-act to discharge the seeds at a desired trajectory and velocity.

Side plates 46 attach to seed slide 40 and are positioned on either side of wheel 42. Side plates 46 and seed slide 40 together define a housing which partially surrounds wheel 42.

Referring now to FIGS. 4–9, seed slide 40 will be described in greater detail. Seed slide 40 has a generally j-shaped configuration, and includes 2 generally linear segments 48 and 50 interconnected by an arc segment 52. Linear segment 48 defines a top end 54 of seed slide 40, and linear segment 50 defines a bottom end 56 of seed slide 40. Linear segment 48 includes a pair of mounting holes 58 which receive fasteners for mounting side plates 46 on opposing edges of seed slide 40. Linear segment 50 is positioned at a predetermined angle relative to the ground, which may vary from one planter to another.

Seed slide 40 includes a seed trough 60 which terminates at bottom end 56. Seed trough 60 does not extend into seed slide 40 at top end 54, and continually increases in depth from top end 54 to bottom end 56. In the embodiment shown, seed trough 60 generally linearly increases in depth from top end 54 to bottom end 56. Further, in the embodiment shown, seed slide 40 has a transverse width of approximately 19 millimeters, and seed trough 60 likewise has a width of approximately 19 millimeters at bottom end 56.

Seed trough 60 has a maximum depth of approximately 5 millimeters at bottom end 56. The increasing depth of seed trough 60 ensures that at the bottom end of seed slide 40 the depth is at a maximum so as to provide a more accurate seed trajectory into the seed trench. Moreover, the lesser depth of the seed trough in the area adjacent wheel 42 ensures that a nip is defined therebetween which positively engages the seeds for acceleration by wheel 42.

Seed slide 40 may be constructed from any suitable material, such as metal, plastic or the like. Moreover, seed slide 40 may be formed using conventional machining and bending processes or may be formed as an injection molded product, depending upon the particular application.

During use, a selected seed type is received from a main seed supply at inlet chute 32 of seed metering system 28. The seed is maintained against a side of seed disc 36, which is driven by drive wheel 34 at a selected rotational speed using a mechanical drive, hydraulic motor, electric motor or other suitable drive. Seeds are received within seed cells 38 of seed disc 36. To assist seed movement into seed cells 38, a vacuum pressure is applied to the opposite side of seed disc 36 using a suitable vacuum source. Of course, a positive pressure may also be applied to the side of seed disc 38 at which the seeds are disposed. The seeds are discharged from seed metering system 28 at a predetermined rate through discharge chute 62. Deflector 64 assists in guiding the seeds into the nip area formed between wheel 42 and seed slide 40. Deflector 64 may also locally deflect the bristles of gripping outside layer 66 as it rotates therepast. Deflection of the bristles assists in gripping the seeds and carrying the seeds into the nip adjacent seed slide 40. The gap of approximately one millimeter between the circumferential periphery of wheel 42 and seed slide 40 ensures that the seed is gripped by gripping outside layer 66 without applying to much force against the seed. Resilient middle layer 68 also may be compressed depending on the seed size and/or orientation as it travels in the area between wheel 42 and seed slide 40.

Seed trough 60 continually increases in depth and maintains the seeds along the longitudinal axis of seed slide 40. The seed is accelerated to approximately match the ground speed of the seeding machine and is discharged from seed trough 60 at bottom end 56 into the seed trench formed in the soil. Gauge/closing wheels 22 and closing wheels 26 close the seed trench and thereby cover the seed in the trench.

Having described the preferred embodiment, it will become apparent that various modifications can be made without departing from the scope of the invention as defined in the accompanying claims.

The invention claimed is:

1. A seeding machine, comprising:
    at least one seed metering system;
    at least one seed placement system, each said seed placement system being in communication with a corresponding said seed metering system, each said seed placement system including a seed slide having a bottom end and a seed trough terminating at said bottom end, said seed slide having a top end, said seed trough not extending to said top end, said seed trough increasing in depth toward said bottom end; and
    a rotatable seed velocity regulator positioned in association with said seed slide.

2. The seeding machine of claim 1, wherein said seed slide has a top end, and said seed trough does not extend into said seed slide at said top end and has a maximum depth at said bottom end.

3. The seeding machine of claim 1, wherein said seed trough has a depth of about 5 mm at said bottom end.

4. A seeding machine, comprising:
    at least one seed metering system;
    at least one seed placement system, each said seed placement system being in communication with a corresponding said seed metering system, each said seed placement system including a seed slide having a bottom end and a seed trough terminating at said bottom end, said seed slide having a generally j-shaped configuration; and
    a rotatable seed velocity regulator positioned in association with said seed slide.

5. The seeding machine of claim 4, wherein said seed slide includes two generally linear segments interconnected by an arced segment, one said linear segment defining said bottom end.

6. A seeding machine, comprising:
    at least one seed metering system;
    at least one seed placement system, each said seed placement system being in communication with a corresponding said seed metering system, each said seed placement system including a seed slide having a bottom end and a seed trough terminating at said bottom end, said seed trough having a generally parabolic shaped cross section at said bottom end; and
    a rotatable seed velocity regulator positioned in association with said seed slide.

7. A method of placing seeds with a seeding machine in a trench formed in soil, comprising the steps of:
    receiving seeds at a predetermined rate at a seed slide in a seed placement system, said seed slide having a bottom end and a seed trough terminating at said bottom end;
    engaging the seeds at the predetermined rate within said seed trough;
    imparting a velocity to the seeds by way of a rotatable seed velocity regulator associated with said seed slide, said seed slide extending beyond said rotatable seed velocity regulator; and
    guiding the seeds from said seed trough into the trench at a trajectory defined by said seed trough.

8. The method of placing seeds of claim 7, wherein said seed slide has a top end, and said seed trough does not extend to said top end.

9. A method of placing seeds with a seeding machine in a trench formed in soil, comprising the steps of:
    receiving seeds at a predetermined rate at a seed slide in a seed placement system, said seed slide having a bottom end and a seed trough terminating at said bottom end, said seed slide having a top end, said seed trough not extending to said top end, said seed trough increasing in depth toward said bottom end;
    engaging the seeds at the predetermined rate within said seed trough;
    imparting a velocity to the seeds by way of a rotatable seed velocity regulator associated with said seed slide; and
    guiding the seeds from said seed trough into the trench at a trajectory defined by said seed trough.

10. A method of placing seeds with a seeding machine in a trench formed in soil, comprising the steps of:
    receiving seeds at a predetermined rate at a seed slide in a seed placement system, said seed slide having a bottom end and a seed trough terminating at said bottom end, said seed slide having a generally j-shaped configuration;
    engaging the seeds at the predetermined rate within said seed trough;
    imparting a velocity to the seeds by way of a rotatable seed velocity regulator associated with said seed slide; and
    guiding the seeds from said seed trough into the trench at a trajectory defined by said seed trough.

* * * * *